United States Patent [19]

de Seroux et al.

[11] Patent Number: 5,151,245
[45] Date of Patent: Sep. 29, 1992

[54] DEVICE FOR THE SEALED OPENING AND CLOSING OF A PASSAGE INTERCONNECTING A CENTRAL CHANNEL OF A TRANSPORTABLE HOLLOW BODY AND A VERTICAL WELL FORMED IN A FIXED STRUCTURE

[75] Inventors: Nicolas de Seroux; Dominique Limouzin, both of Lyons, France

[73] Assignee: Framatome, France

[21] Appl. No.: 721,416

[22] Filed: Jun. 26, 1991

[30] Foreign Application Priority Data

Jun. 27, 1990 [FR] France .................. 90 08116

[51] Int. Cl.⁵ ............................. G21C 19/00
[52] U.S. Cl. .......................... 376/271; 376/268; 376/203
[58] Field of Search ............... 376/206, 203, 271, 268, 376/272; 414/786; 976/DIG. 175, DIG. 177

[56] References Cited

U.S. PATENT DOCUMENTS

| | | | |
|---|---|---|---|
| 4,062,723 | 12/1977 | Andrea | 376/268 |
| 4,064,000 | 12/1977 | Andrea | 376/271 |
| 4,732,527 | 3/1988 | Conshe | 414/786 |

FOREIGN PATENT DOCUMENTS

| | | |
|---|---|---|
| 0212028 | 3/1987 | European Pat. Off. . |
| 0267083 | 5/1988 | European Pat. Off. . |
| 1346486 | 11/1963 | France . |
| 2175238 | 11/1986 | United Kingdom . |

Primary Examiner—Brooks H. Hunt
Assistant Examiner—Meena Chelliah
Attorney, Agent, or Firm—Pollock Vande Sande & Priddy

[57] ABSTRACT

The device comprises, in positions adjacent to the bearing surface (15) of the transportable container (1) on the fixed structure, a first member (16) for plugging the central channel (3) of the container (1), and a second member (17) for plugging the upper end of the well (18). These members are arranged inside a zone of contact of at least one o-ring seal (13) with the bearing surface (15). Each of the plugging members (16, 17) comprises a planar surface arranged, in its closing position, in the planar bearing surface (15) of the container or in the planar bearing surface of the fixed structure, respectively. At least one of the plugging members (16, 17) can move in the axial direction of the well (18) and of the central channel (3) of the container (1) and in a transverse direction perpendicular to the axial direction, between its closing position and its opening position.

6 Claims, 6 Drawing Sheets

FIG.1

FIG_2

FIG.3

FIG_4

FIG.5

DEVICE FOR THE SEALED OPENING AND CLOSING OF A PASSAGE INTERCONNECTING A CENTRAL CHANNEL OF A TRANSPORTABLE HOLLOW BODY AND A VERGICAL WELL FORMED IN A FIXED STRUCTURE

FIELD OF THE INVENTION

The invention relates to a device for the sealed opening and closing of a passage interconnecting a central channel of a transportable container and a vertical well formed in a fixed structure.

In particular, the invention concerns a device for the sealed opening and closing of a passage interconnecting the central channel of a transfer cask of a fuel assembly for a fast-neutron nuclear reactor cooled by a liquid metal, and a through passage enabling a fuel assembly to be removed from, or introduced into, the vessel of the nuclear reactor or a zone for storage or deactivation of the assembly.

BACKGROUND OF THE INVENTION

Fast-neutron nuclear reactors cooled by a liquid metal such as sodium comprise a core consisting of fuel assemblies of a prismatic and elongated shape which are immersed in liquid sodium contained in the vessel of the reactor.

It may be necessary to remove fuel assemblies from the core of the reactor, inside the vessel, for example to replace old or faulty assemblies with new assemblies. The assemblies which have been taken out of the vessel of the reactor are in an irradiated state and produce radioactive radiation. Furthermore, these assemblies have residual activity and are the source of a release of heat produced by tho nuclear reactions in the irradiated fuel. Lastly, these assemblies retain, when they are taken out of the vessel, a certain quantity of liquid sodium.

The fuel assemblies taken out of the vessel of the nuclear reactor must therefore be arranged in containers ensuring the biological protection of the environment in which the assemblies are moved or stored temporarily. The assembly must also be cooled during its transfer.

For the transfer and temporary storage of fuel assemblies of fast-neutron nuclear reactors, casks are conventionally- used which comprise a solid body made of a material absorbing nuclear radiation and in which is formed a housing for a fuel assembly which may be bare or sunk in a casing filled with sodium in order to cool ,it.

The housing for the assembly, which is in the form of a central channel inside the body of the cask, opens out, via an aperture which can be plugged in sealing fashion, at one of the ends of the body of the cask, so as to permit the introduction of the assembly into the cask and its extraction. These operations are carried out after the transfer cask has been put in a position where it bears on a fixed structure, for example a structure integral with the slab closing the vessel of the reactor, in such a way that the central channel of the cask is situated in the axial extension of a through well of the fixed structure, for example of a vertical well traversing the slab.

A sealing device comprising at least one O-ring seal is inserted between the lower bearing surface of the support of the valve with which the transfer cask is equipped and the corresponding bearing surface of the fixed structure. The device for the sealed plugging of the aperture of the central channel of the cask opening out on the bearing surface of the support of the valve, and a second device for the sealed closing of the upper end of the vertical well of the fixed structure opening out on the bearing surface of the fixed structure, are arranged inside the zone of contact of the inner seal of the sealing device, in aligned axial positions.

In order to carry out an operation of removing or introducing a fuel assembly, the devices for plugging the central channel of the cask and the vertical well must be placed in their open position, after the transfer cask has been fitted onto the fixed structure. The plugging devices known in the prior art consist of valves, for example with a gate, a ball or a rotary plug, the plugging discs of which are separated by design or must be situated at a certain vertical distance from each other, after the cask has been fitted, in order to permit their operation both for opening and for closing.

Such an arrangement results in a rather large free space defined by the inner seal of the sealing device and by the outer surfaces of the discs when the cask has been fitted into position on the fixed structure; this represents a disadvantage insofar as all contact must be avoided between an oxidizing gas and the reactive liquid metal such as sodium in which the fuel assemblies of the reactor are immersed.

After transfer of the fuel assembly between the cask and the vessel of the reactor, the discs of the valves for plugging the cask and the passage well are closed again, with the result that a certain volume of gases which are polluted by radioactive substances is trapped in the space between the outer surfaces of the discs of the valves.

The free space between the outer surfaces of the discs of the valves must therefore be scavenged, both after the cask has been fitted, in order to remove any trace of oxygen in this space, and before the cask is disconnected, in order to remove any trace of gas likely to contaminate the surrounding environment with radioactive products.

This scavenging must be carried out using an neutral gas such as argon, with the result that a reserve of argon and scavenging means must be made available, which means must be connected to the cask or to the vertical well of the fixed structure.

Furthermore, this operation of scavenging the space lying between the closing valves of the cask and of the vertical well increases the time required for handling the fuel assembly.

The loading and unloading of the core of a nuclear reactor require numerous fuel assembly transfer operations, so that it is extremely important to reduce as far as possible the time required to transfer an assembly, in order to limit the downtime of the reactor for reloading or unloading.

SUMMARY OF THE INVENTION

The object of the invention is therefore to provide a device for the sealed opening and closing of a passage interconnecting a central channel of a transportable container and a vertical well formed in a fixed structure comprising a bearing structure via which the upper part of the vertical well opens out and on which rests, with the interposition of at least one O-ring seal, a corresponding bearing surface of the container via which the central channel opens out, in a connected position in which one end of the central channel of the container is situated in the axial extension of the well in order to form the connecting passage, comprising, in positions adjacent to the corresponding bearing surface, a member for plugging the central channel of the container and a member for plugging the upper end of the well, which members are arranged inside a zone of contact of the O-ring seal with the bearing surfaces, this device making it possible to prevent a volume of gas from being trapped between the plugging members of the central channel of the container and of the vertical well when the container is brought to bear on the fixed structure and following the transfer of a component between the container and the fixed structure.

To this end, each of the plugging members comprises a plane surface arranged, in its closing position, in the plane bearing surface of the container or in the plane bearing surface of the fixed structure, respectively, such that the space between these two plane surfaces is reduced to a negligible volume and at least one of the plugging members can move in the axial direction of the well and of the central channel of the container and in a transverse direction perpendicular to the axial direction, between its closing position and its opening position.

BRIEF DESCRIPTION OF THE DRAWINGS

In order to make the invention readily comprehensible, an embodiment of a device for sealed opening and closing according to the invention, applied to the case of a cask for transferring a fuel assembly for a fast-neutron nuclear reactor, which cask is intended to interact with a vertical passage traversing the slab of the reactor during unloading and reloading of the core of the reactor, will now be described by way of example and with reference to the accompanying drawings.

DETAILED DESCRIPTION

Figure 1:
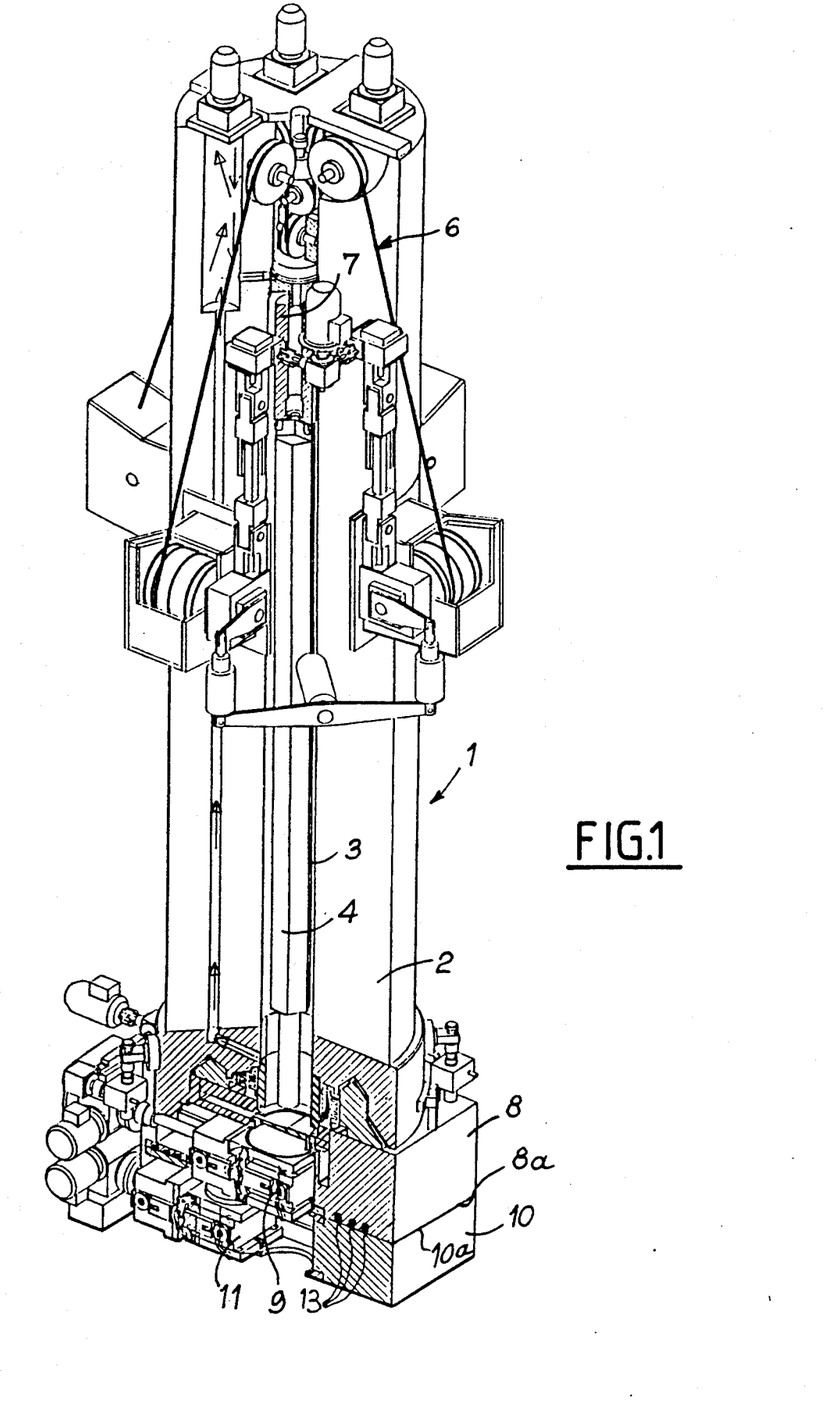
FIG. 1 is an overall view, in exploded perspective and in partial section, of a cask for transferring a fuel assembly for a fast-neutron nuclear reactor.

FIG. 1 shows a cask 1 for transferring a fuel assembly for a nuclear reactor. The cask 1 comprises a cask body 2 of cylindrical shape comprising, at its central part and along its axis, a channel 3 traversing the cask body over its entire length. The cask body consists of a solid steel piece of great thickness and of great length.

In the case of a fuel assembly for a fast-neutron reactor, which is longer than 4 m and has a hexagonal cross-section, the side length of which is 125 mm, the body 2 of the cask has an external diameter of 1.30 m, a central channel of a diameter of 0.30 m and a length of 6 m. The body of the cask therefore has a wall thickness of 0.50 m; its total mass is close to 55 tons.

In FIG. 1, the fuel assembly has been shown in its transport position inside the central channel 3 of the body of the cask. The assembly 4 takes up only part of the length of the channel 3; the gripper 7 of the device 6 for lifting the assembly is placed in the upper part of the channel 3.

The lower part of the body 2 is joined to the support 8 of a motorized cask valve 9 permitting the sealed opening or closing of the end of the channel 3 at its lower part opening out at the end of the body 2.

The cask valve support 8 can rest, via a bearing surface 8a, on a corresponding bearing surface 10a of the support 10 of a well valve 11 permitting the sealed opening or closing of a through well, for example a through passage of a slab covering the vessel of a reactor containing liquid sodium and enclosing the core of the reactor.

A sealing device comprising O-ring seals 13 is inserted between the bearing surfaces 8a and 10a in the joined position of the transfer cask 1 shown in FIG. 1.

The plugging members of the valves 9 and 11 are arranged inside the zone defined by the O-ring seal 13 constituting the inner part of the sealing device.

When the valves 9 and 11 are superposed and open, the fuel assembly 4 can be moved from a position immersed in the liquid sodium filling the vessel of the reactor into its transfer position inside the cask 1 by using the lifting device 6.

Figure 2:
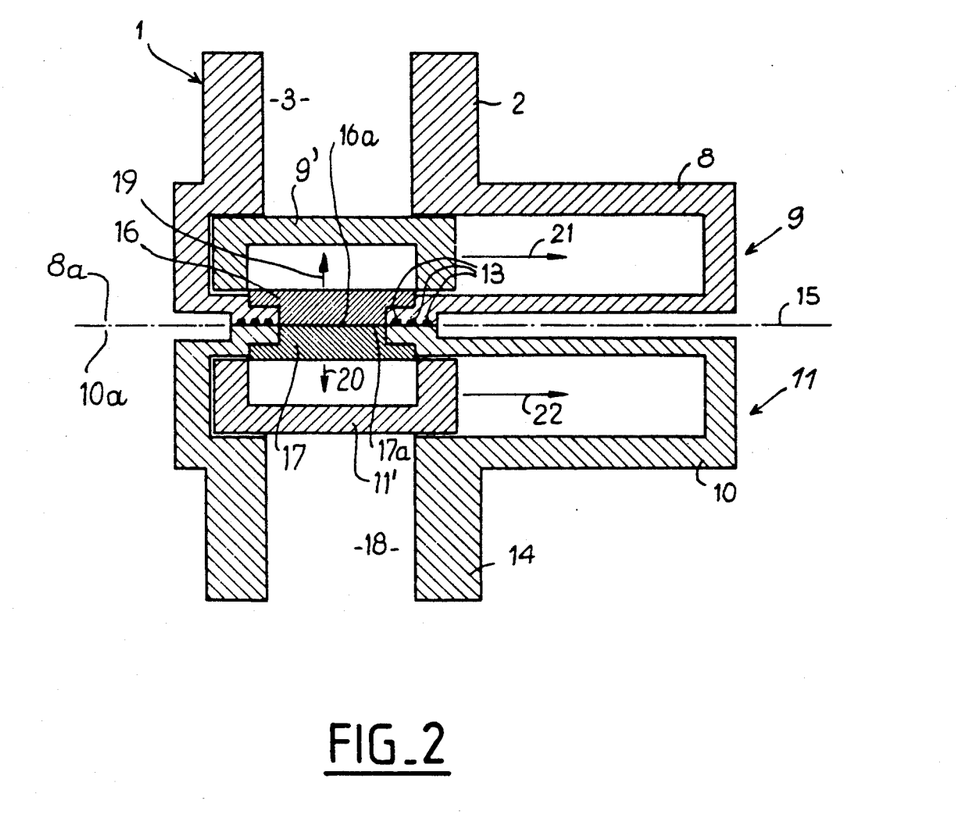
FIG. 2 is a schematic sectional view through a vertical plane of an opening and closing device according to the invention, associated with a cask for transferring a fuel assembly and with a fixed structure on which the transfer cask rests.

The lower part of the cask 2, shown schematically in FIG. 2 comprises the support 8 of valve 9, and the upper outlet part 14 of the well 18 traversing the slab of the reactor, which upper part comprises the support 10 of the valve 11.

The valves 9 comprises a plug 16 which has been shown in FIG. 2 in its closing position. The plug 16 comprises a plane sealing surface 16a which is placed, in the closing position of the plug 16, in the bearing plane 8a of the support 8 of the valve 9.

The valve 11 comprises a plug 17 which has been shown in FIG. 2 in its closing position.

The plug 17 comprises a plane sealing surface 17a which is situated, in the closing position of the plug 17, in the bearing plane 10a of the support 10 of the valve 11.

When the transfer cask 1 rests on the fixed structure consisting of the through well 14, the bearing surfaces 8a and 10a of the supports 8 and 10, respectively, are in abutment along the join plane 15. The seals 13 consisting of a flexible material such as an elastomer are crushed so as to ensure the sealing between the bearing surfaces 8a and 10a which have come into contact with each other along the plane 15.

As can be seen in FIG. 2, when the transfer cask 1 rests on the upper part 14 of the well 18 in a position permitting the transfer of a fuel assembly between the central channel 3 and the vertical well 18, the plugs 16 and 17 are placed in their closing position, such that the bearing and sealing surfaces 16a and 17a, which are absolutely planar and which are respectively positioned in the bearing planes 8a and 10a, come into contact with each other, with the result that there is no layer of air between them.

Furthermore, the plugs 16 and 17 can be displaced inside the valve bodies 9, and 11; respectively, in the axial direction of the channel 3 and of the vertical well 18, as shown by the arrows 19 and 20, respectively.

The displacement of the plugs 16 and 17 in the direction of the arrows 19 and 20 makes it possible to separate the sealing surfaces 16a and 17a and to place the plugs 16 and 17 in the valve bodies 9, and 11; respectively.

The valve bodies and the plugs 16 and 17 can then be displaced in a transverse direction perpendicular to the axial direction of the channel 3 and of the well 18, as shown by the arrows 21 and 22.

This transverse displacement of the plugs 16 and 17 and of the valve bodies 9' and 11' enables the channel 3 to be connected to the vertical well 18.

When the cask 1 is being fitted onto the upper part 14 of the well 18, no layer of air is trapped between the plugs 16 and 17, with the result that it is not necessary to scavenge the space between the plugs 16 and 17.

When the valves 9 and 11 are closed, after an assembly has been transferred between the central channel 3 of the cask 1 and the vertical well 18, by displacements which are the opposite of the displacements described above and are indicated by the arrows 19 and 21 and 20 and 22, the plugs 16 and 17 resume the position shown in FIG. 2, with the result that no layer of gas polluted by radioactive substances is trapped between the sealing surfaces 16a and 17a.

The transfer cask 1 can be disconnected and raised above the fixed structure constituted by the upper surface 14 of the well 18 without prior scavenging with neutral gas, of the volume lying between the plugs 16 and 17.

Figure 3:
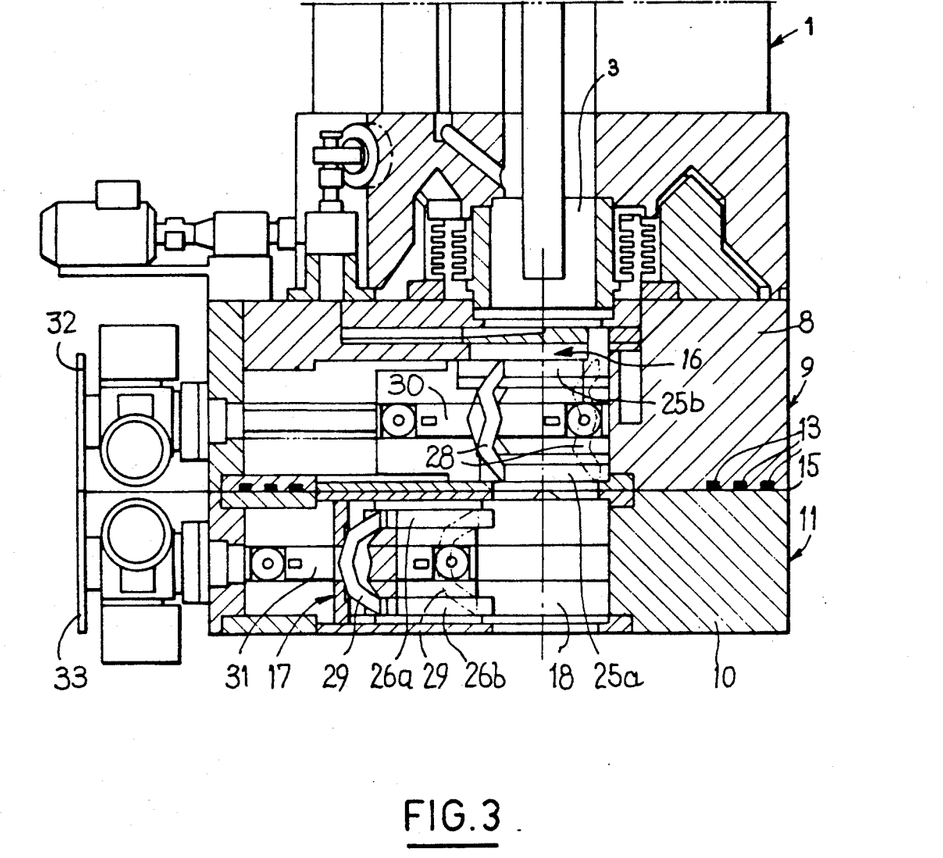
FIG. 3 is a detailed view in section through a vertical plane of the opening and closing device shown in FIG. 2.

The device for sealed opening and closing according to the invention, shown schematically in FIG. 2 is shown in more detail in FIG. 3.

In FIG. 3, the plug 16 of the cask valve 9 is shown in its closed position and the plug 17 of the well valve 11 in its open position.

The plugs 16 and 17 have an articulated structure and each comprise two parallel plates 25a and 25b and 26a and 26b, respectively. The plates 25a and 26a constitute the sealing elements of the plugs 16 and 17, respectively, and each comprise a plane outer face defining the sealing surface 16a or 17a of the corresponding plug 16 or 17.

In the closing position of the plugs 16 and 17, the plane outer faces of the plates 25a and 26a are situated in the join plane 15 of the cask valve 9 on the well valve 11.

The plates 25a and 25b, on the one hand, and 26a and 26b, on the other hand, are connected together by sets of articulated connecting rods 28 and 29 which enable the plates 25a and 25b and 26a and 26b respectively to be held in mutually parallel arrangements during their displacements.

Figure 5:
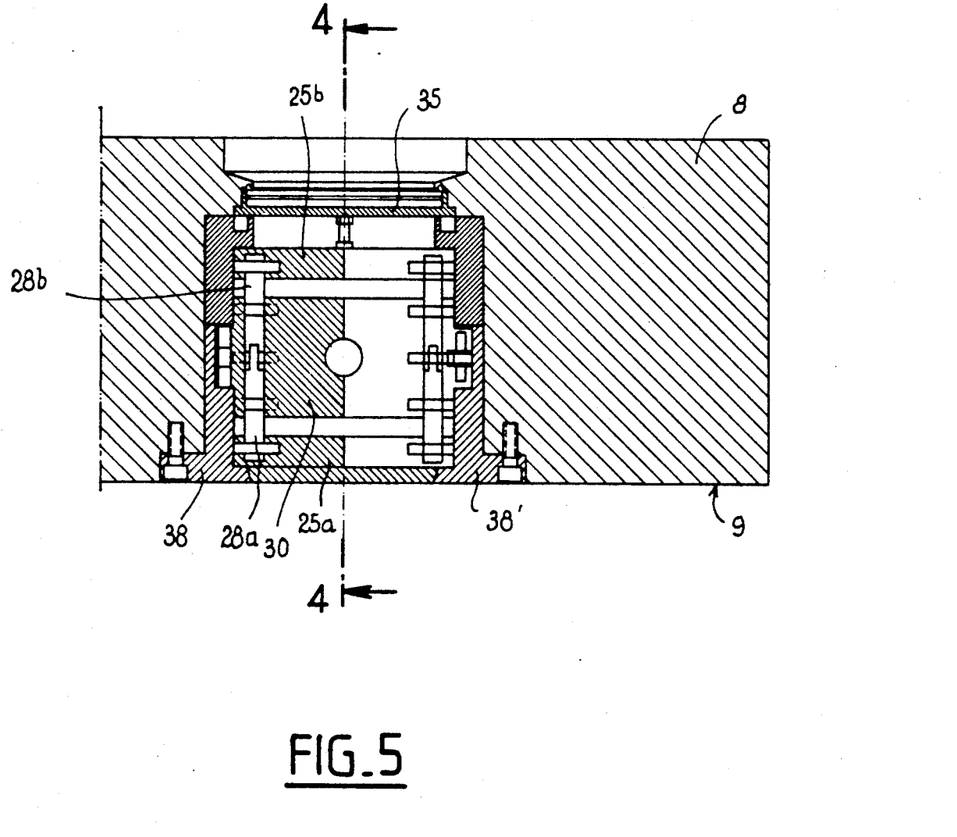
FIG. 5 is a view in section along line 5—5 in FIG. 4.
Figure 6:
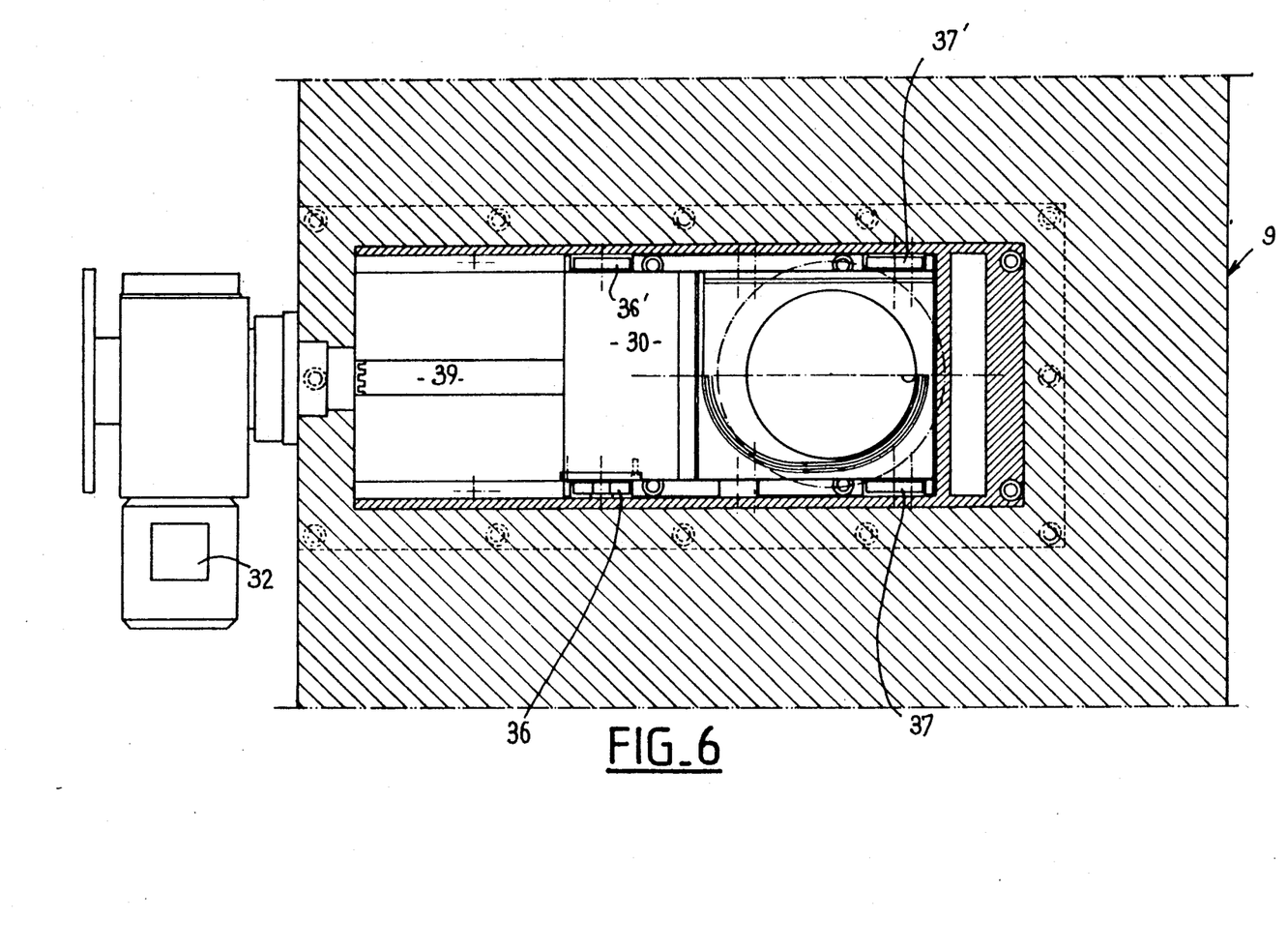
FIG. 6 is a top view, partly in section, of the upper part of the opening a closing device shown in FIGS. 4 and 5.

The connecting-rod assemblies 28 and 29 are mounted in articulated fashion on slides 30 and 31, respectively. The slides 30 and 31 are mounted for movement in a transverse direction perpendicular to the axis of the well and of the cask by virtue of guide means and servomotors 32, 33 and control worms connected to the output shaft of the motors 32 and 33. These guide and displacement means will be described in more detail with respect to the well valve 9, with reference to FIGS. 4, 5 and 6.

Figure 4:
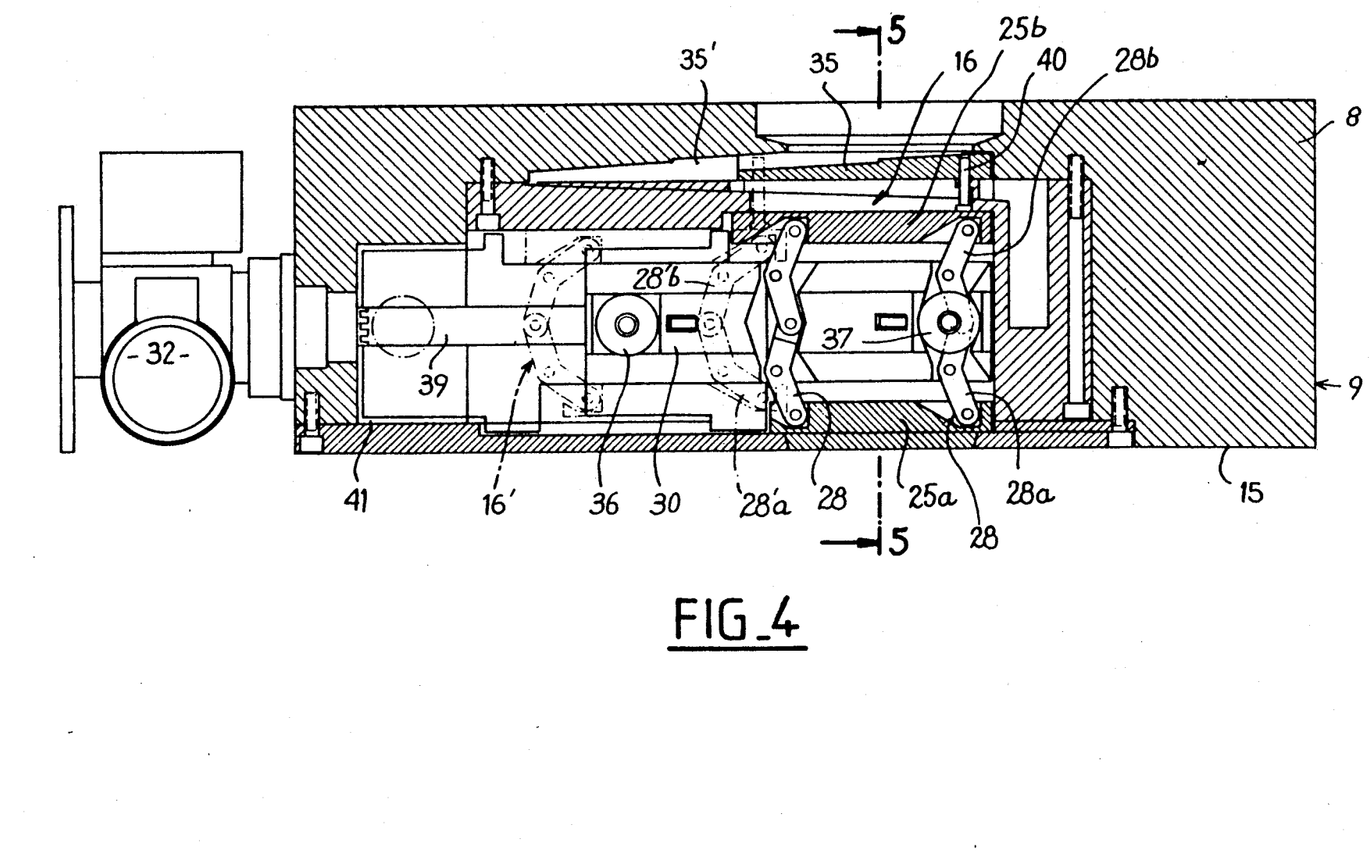
FIG. 4 is a view in section along line 4—4 in FIG. 5 of the upper part associated with the transfer cask of the opening and closing device shown in FIG. 3.

The structures of valves 9 and 11 are substantially identical, the cask valve 9 comprising, however, an additional safety plug 35 which can be displaced between a position in the extension of the central channel 3 of the cask and a position set back in a lateral housing 35', when the plug 16 is displaced between its closing position shown in solid lines in FIG. 4, and its opening position 16', shown in dot-dash lines.

The connecting-rod assembly 28 of the plug 16 comprises four sets of connecting rods such as 28a and 28b articulated to one another and connected to the slide 30 at one of their ends and to the plates 25a and 25b at their other ends in articulated fashion. Each of the sets of connecting rods is fixed in an opening of matching shape formed in the slide 30.

The slide 30 comprises guide elements consisting of rollers 36, 36' and 37, 37' (FIG. 6) mounted for movement inside two-part slideways 38, 38' (FIG. 5) fixed in the valve support 8.

The lateral displacements of the slide 30 are controlled by the motor 32, via a reduction unit with right-angled transmission and via a worm 39 engaged, in a central position, in the slide 30.

The displacements of the additional plug 35 are achieved by way of a finger 40 engaged freely in an aperture of the plug 35 and connected to the plate 25b of the plug 16.

The operation of the plug 16 which has been described in general terms with respect to FIG. 2 will now be described in more detail with reference, in particular, to FIG. 4.

Assuming that the plug 16 is in its closing position, shown in solid lines in FIG. 4, the opening of the plug 16 can be achieved by way of the servomotor 32 driving the worm 39 and the lateral displacement of the slide 30 guided by the roller and slideway assemblies.

The shape of the apertures in which the sets of connecting rods of the assembly 28 are engaged is such that the initial displacement of the slide 30 is translated by a pivoting of the connecting rods such as 28a and 28b, such that their ends, articulated on the plates 25a and 25b, respectively, are displaced towards each other. The connecting rods 28a and 28b are placed in inclined positions such as 28'a and 28'b, such that the plates 25a and 25b are displaced parallel to each other and so as to approach each other.

This initial displacement of the plates 25a and 25b enables, in particular, the sealing surface of the plate 25a to be moved away from join plane 15 of the cask valve on the well valve.

Simultaneously with the displacement of the plate 25a, the servomotor 33 of the well valve 11 enables the plate 26a of the plug 17 of the well valve to be displaced in the opposite direction.

The subsequent transverse displacement of the slides 30 and 31, after retraction of the plates of the corresponding plugs 16 and 17, is translated by a displacement of the whole plug inside housings such as 41 of the valve supports 8 and 10.

The plugs 16 and 17 assume transverse set-back positions permitting interconnection to be established between the central channel 3 of the cask 1 and the well 18 of the fixed structure 14.

Simultaneously with the transverse displacement of the 16, the additional plug 35 is displaced so as to enter into the lateral housing 35' which is set back with respect to the passage for the interconnection of the central channel of the cask and the well 18 of the fixed structure.

The displacement in the opposite direction of the plugs 16 and 17, achieved by way of the servomotors 32 and 33, initially enables the plugs to be displaced in the transverse direction, until these plugs are situated opposite the passage interconnecting the central channel 3 of the cask and the well 18 of the fixed structure.

A final supplementary displacement of the corresponding slides 30 and 31 enables the plates 25a and 26a of the plugs 16 and 17, respectively, to be returned to their closing position.

In this position, the plugs come into sealing contact with each other by way of their plane surfaces 16a and 17a situated in the join plane 15.

In order to eliminate as far as possible the free space between the surfaces 16a and 17a, the metal plane surfaces of the plates 25a and 26a can be covered with a layer of elastomer.

As explained above with reference to FIG. 2, the valves of the device according to the invention enable the cask to be fitted onto the fixed structure without trapping a layer of air between the sealing surfaces of the plugs.

Similarly, when the plugs are being closed, after the transfer of the assembly between the well 18 and the central channel 3 of the cask, the valves of the device according to the invention enable the sealing surfaces 16a and 17a to be applied against each other without trapping a layer of gas polluted by radioactive substances in the space inside the seals 13.

The device for sealed opening and closing according to the invention therefore makes it possible to obviate the need for scavenging of the zone situated between the plugs with a neutral gas.

The mechanism for displacement in the longitudinal direction and in the transverse direction of the plugs could be achieved equally well by mechanical, pneumatic or hydraulic means.

The device for sealed opening and closing according to the invention can comprise a single longitudinaldisplacement and transverse-displacement plug like the plugs 16 and 17, it being possible for the second plug, for example the plug of the well of the fixed structure, to consist of a stopper having a plane sealing surface in the fitting plane 15 between the cask and the fixed structure traversed by the well 18. After opening the plug of the cask valve, the stopper can be removed by a maneuvering associated with the cask.

Lastly, the device according to the invention could be used for opening and closing a passage interconnecting a channel of a transportable hollow body other than a cask for handling a fuel assembly and a well of a fixed structure into which an element transported inside the hollow body is introduced.

We claim:

1. Device for sealed opening and closing of a passage interconnecting a central channel (3) of a transportable container (1) and a vertical well (18) in a fixed structure (14) comprising a bearing surface (10a, 15) via which an upper part of said vertical well (18) opens out and on which rests, with the interposition of at least one O-ring seal (13), a corresponding bearing surface (8a) of said container (1) via which said central channel (3) opens out, in a connected position in which one end of said central channel (3) of said container (1) is located in an axial extension of said well (18) in order to form a connecting passage, said device comprising, in positions adjacent to a corresponding bearing surface (8a, 10a, 15), a first member (16) for plugging said central channel (3) of the container (1) and a second member (17) for plugging said upper end of said well (18), said first and second members being arranged in a contact zone of said at least one O-ring seal (13) with said bearing surface (8a, 10a, 15), wherein said first plugging member comprises a first plannar surface (16a, 17a) arranged, when in closing position, in said planar bearing surface (10a) of said fixed structure (14, 10), respectively, such that a space between said first and second plannar surfaces is reduced to a negligible value, at least one of said first and second plugging members (16, 17) being adapted to move in an axial direction of said well (18) and of said central channel (3) of said container (1) and in a transverse direction perpendicular to said axial direction, between said closing position and said opening position.

2. Device according to claim 1, wherein each of said first and second members (16, 17) is adapted to move in said axial direction of said well (18) and of said central channel (3) and in a transverse direction and consists of two parallel plates connected by assemblies of articulated connecting rods (28, 29) to a slide (30, 31) associated with means for displacement in the transverse direction (32, 33, 39) and with guide means (36, 36', 37, 37', 38, 38') for displacement of a corresponding plugging member (16, 17) between a closing position and an opening position of said plugging member, one of the plates (25a, 26a) of said plugging members (16, 17) comprising a planar sealing surface (16a, 17a) which takes up a position in the bearing plane (15) of said container (1) on said fixed structure (14), in said closing position of said plugging member (16, 17).

3. Device according to claim 2, wherein said means of displacement (32, 33, 39) of said slides (30, 31) of said plugging members in transverse direction consist of a geared motor assembly and a control worm.

4. Device according to claim 2, wherein said guide means (36, 36', 37, 37') of said slides (30, 31) of said plugging members (16, 17) consist of rollers which are mounted rotatably on said slides (30, 31) and of slideways (38, 38') fixed inside a fixed body (8, 10) integral with said container (1) or with said fixed structure (14).

5. Device according to claim 1, wherein a planar surface of each of said plugging members (16, 17) taking up a position in said bearing plane (15) of said container (1) or of said fixed structure (14) is covered with a sealing elastomeric material.

6. Device according to claim 2, wherein said container (1) consists of a cask for handling a fuel assembly for a nuclear reactor, said device further comprising a supplementary closing plate (35) connected via an actuating finger (40) to one of the plates (25b) of said plugging member (16).

* * * * *